US012416871B2

(12) United States Patent
Shinozuka et al.

(10) Patent No.: US 12,416,871 B2
(45) Date of Patent: Sep. 16, 2025

(54) ELECTROPHOTOGRAPHIC PHOTOSENSITIVE MEMBER, PROCESS CARTRIDGE, ELECTROPHOTOGRAPHIC APPARATUS, AND METHOD OF MANUFACTURING ELECTROPHOTOGRAPHIC PHOTOSENSITIVE MEMBER

(71) Applicant: CANON KABUSHIKI KAISHA, Tokyo (JP)

(72) Inventors: Masayuki Shinozuka, Ibaraki (JP); Motoya Yamada, Chiba (JP); Koji Takahashi, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 827 days.

(21) Appl. No.: 17/649,570

(22) Filed: Feb. 1, 2022

(65) Prior Publication Data

US 2022/0283522 A1 Sep. 8, 2022

(30) Foreign Application Priority Data

Feb. 26, 2021 (JP) ................................ 2021-031207

(51) Int. Cl.
*G03G 15/00* (2006.01)
*G03G 5/10* (2006.01)

(52) U.S. Cl.
CPC ............ *G03G 5/102* (2013.01); *G03G 15/75* (2013.01)

(58) Field of Classification Search
CPC ............................... G03G 5/102; G03G 15/75
See application file for complete search history.

(56) References Cited

U.S. PATENT DOCUMENTS

| | | | |
|---|---|---|---|
| 6,322,943 B1 | 11/2001 | Aoki et al. | |
| 8,457,528 B2 | 6/2013 | Ochi et al. | |

(Continued)

FOREIGN PATENT DOCUMENTS

| | | |
|---|---|---|
| CN | 1196505 A | 10/1998 |
| CN | 102998920 A | 3/2013 |
| CN | 111552153 A | 8/2020 |
| JP | 6429852 A | 1/1989 |

(Continued)

OTHER PUBLICATIONS

JP-2003114542-A Translation (Year: 2024).*

(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

Provided is an electrophotographic photosensitive member that suppresses an image defect resulting from its support and is reduced in long-term potential fluctuation. The electrophotographic photosensitive member is an electrophotographic photosensitive member including a support having a cylindrical shape and a photosensitive layer formed on the support, wherein the support has a surface formed of Al and/or an Al alloy, and wherein the IR peak area ratio A of the surface of the support determined by Fourier transform infrared spectroscopy satisfies the following condition: $A \geq 0.50$ where the IR peak area ratio A represents a ratio a/z of a peak area "a" in the range of from 1,016 $cm^{-1}$ or more to 1,130 $cm^{-1}$ or less to a peak area "z" in the range of from 650 $cm^{-1}$ or more to 1,130 $cm^{-1}$ or less.

14 Claims, 2 Drawing Sheets

(56) References Cited

U.S. PATENT DOCUMENTS

| | | | |
|---|---|---|---|
| 8,703,373 | B2 | 4/2014 | Iwasaki et al. |
| 8,865,380 | B2 | 10/2014 | Noguchi et al. |
| 9,114,565 | B2 | 8/2015 | Kawai et al. |
| 9,389,521 | B2 | 7/2016 | Takahashi et al. |
| 9,766,561 | B2 | 9/2017 | Takahashi et al. |
| 9,772,596 | B2 | 9/2017 | Mitsui et al. |
| 10,042,273 | B2 | 8/2018 | Takahashi et al. |
| 10,429,754 | B2 | 10/2019 | Takahashi et al. |
| 11,048,181 | B2 | 6/2021 | Iwasaki et al. |
| 11,112,707 | B2 | 9/2021 | Takahashi et al. |
| 2002/0098429 | A1 | 7/2002 | Kimura |
| 2006/0194132 | A1 | 8/2006 | Hosoi et al. |
| 2014/0093281 | A1 | 4/2014 | Takahashi et al. |
| 2014/0255834 | A1 | 9/2014 | Nukada |
| 2021/0302849 | A1 | 9/2021 | Takahashi |

FOREIGN PATENT DOCUMENTS

| | | | | |
|---|---|---|---|---|
| JP | 6-11848 | A | | 1/1994 |
| JP | 10-288844 | A | | 10/1998 |
| JP | 2003114542 | A | * | 4/2003 |
| JP | 2013-109035 | A | | 6/2013 |
| JP | 2017-211537 | A | | 11/2017 |

OTHER PUBLICATIONS

United Aluminum, Aluminum 3003 Alloy Data Sheet, https://unitedaluminum.com/aluminum-3003-alloy/ (Year: 2024).*
U.S. Appl. No. 17/650,991, Koji Takahashi, filed Feb. 14, 2022.
U.S. Appl. No. 17/651,637, Motoya Yamada, filed Feb. 18, 2022.

* cited by examiner

ELECTROPHOTOGRAPHIC PHOTOSENSITIVE MEMBER, PROCESS CARTRIDGE, ELECTROPHOTOGRAPHIC APPARATUS, AND METHOD OF MANUFACTURING ELECTROPHOTOGRAPHIC PHOTOSENSITIVE MEMBER

BACKGROUND OF THE INVENTION

Field of the Invention

The present invention relates to an electrophotographic photosensitive member, a process cartridge including an electrophotographic photosensitive member, an electrophotographic apparatus, and to a method of manufacturing an electrophotographic photosensitive member.

Description of the Related Art

An electrophotographic photosensitive member is used as an image-bearing member in an electrophotographic image-forming apparatus (e.g., a printer or a multifunction peripheral). The electrophotographic photosensitive member includes a support and a photosensitive layer formed on the support. The roughness of the surface of the support fluctuates depending on a material for the support. The roughness of the surface of the support may affect the formation of a latent image in an electrophotographic process to cause an image defect.

In Japanese Patent Application Laid-Open No. H01-29852, there is a description of a technology including treating the surface of a support having a cylindrical shape for suppressing an image defect resulting from the roughness of the surface of the support.

SUMMARY OF THE INVENTION

According to an investigation by the inventors of the present invention, an electrophotographic photosensitive member as described in Japanese Patent Application Laid-Open No. H01-29852 has involved a problem in that long-term potential fluctuation is large, though the image defect resulting from the support can be suppressed. In view of the foregoing, the inventors have investigated a technology for the treatment of the surface of a support having a cylindrical shape by which both of the suppression of an image defect and a reduction in long-term potential fluctuation can be achieved.

An object of the present invention is to provide an electrophotographic photosensitive member that suppresses an image defect resulting from its support and is reduced in long-term potential fluctuation.

The object is achieved by the present invention described below.

That is, according to the present invention, there is provided an electrophotographic photosensitive member including: a support having a cylindrical shape; and a photosensitive layer formed on the support, wherein the support has a surface formed of Al and/or an Al alloy, and wherein an IR peak area ratio A of the surface of the support determined by Fourier transform infrared spectroscopy satisfies the following condition:

$$A \geq 0.50$$

where the IR peak area ratio A represents a ratio a/z of a peak area "a" in a range of from 1,016 $cm^{-1}$ or more to 1,130 $cm^{-1}$ or less to a peak area "z" in a range of from 650 $cm^{-1}$ or more to 1,130 $cm^{-1}$ or less.

In addition, according to the present invention, there is provided a process cartridge including: the above-mentioned electrophotographic photosensitive member; and at least one unit selected from the group consisting of: a charging unit; a developing unit; and a cleaning unit, the process cartridge integrally supporting the electrophotographic photosensitive member and the at least one unit, and being removably mounted onto a main body of an electrophotographic apparatus.

In addition, according to the present invention, there is provided an electrophotographic apparatus including: the above-mentioned electrophotographic photosensitive member; a charging unit; an exposing unit; a developing unit; and a transferring unit.

In addition, according to the present invention, there is provided a method of manufacturing an electrophotographic photosensitive member including a support having a cylindrical shape and a photosensitive layer formed on the support, wherein forming the support includes subjecting a cylindrical body formed of Al and/or an Al alloy to immersion treatment with pure water to provide the support, wherein the pure water has a temperature of 91° C. or more and 98° C. or less, and the cylindrical body is immersed in the pure water for a time period of 60 seconds or more and 300 seconds or less, and wherein an IR peak area ratio A of a surface of the support determined by Fourier transform infrared spectroscopy satisfies the following condition:

$$A \geq 0.50$$

where the IR peak area ratio A represents a ratio a/z of a peak area "a" in a range of from 1,016 $cm^{-1}$ or more to 1,130 $cm^{-1}$ or less to a peak area "z" in a range of from 650 $cm^{-1}$ or more to 1,130 $cm^{-1}$ or less.

According to the present invention, the electrophotographic photosensitive member that suppresses an image defect resulting from its support and is reduced in long-term potential fluctuation can be provided.

Further features of the present invention will become apparent from the following description of exemplary embodiments with reference to the attached drawings.

DESCRIPTION OF THE EMBODIMENTS

Figure 1:
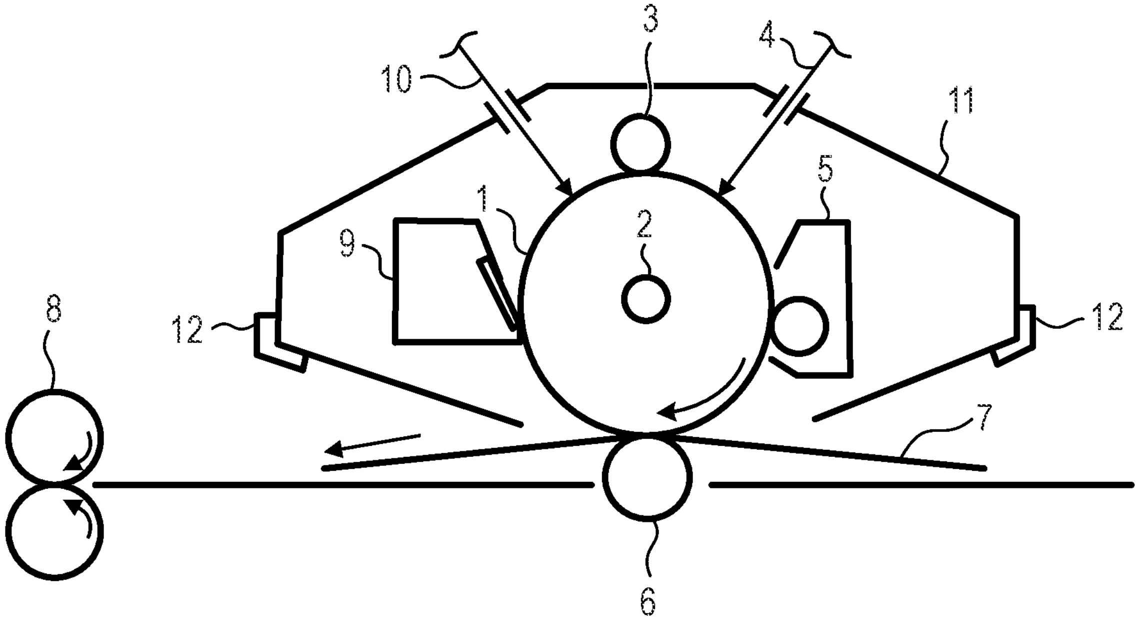
FIG. 1 is a view for illustrating an example of the schematic configuration of an electrophotographic apparatus including a process cartridge including an electrophotographic photosensitive member of the present invention.

The present invention is described in detail below by way of an exemplary embodiment.

[Electrophotographic Photosensitive Member]

An electrophotographic photosensitive member according to this embodiment is an electrophotographic photosensitive member whose support has been subjected to surface treatment so that the IR peak area ratio A of the surface of the support may show a predetermined value range. It has been found that while a related-art electrophotographic photosensitive member having such a configuration that the surface of its support is subjected to oxidation treatment is excellent in property by which an image defect derived from the support is concealed, the photosensitive member involves a problem in that repeated charging of the photosensitive member enlarges long-term potential fluctuation thereof. To solve the problem, the inventors of the present invention have made an investigation with a view to optimizing the composition of the surface of the support through the improvement of a method for the treatment of the surface of the support. As a result of the investigation, the inventors have found that when the IR peak area ratio A of the surface of the support determined by Fourier transform infrared spectroscopy is controlled under the following condition by the treatment of the surface, the long-term potential fluctuation of the photosensitive member can be suppressed as compared to a conventional one while an image defect resulting from the support is concealed:

$$A \geq 0.50$$

where the IR peak area ratio A represents a ratio a/z of a peak area "a" in the range of from 1,016 $cm^{-1}$ or more to 1,130 $cm^{-1}$ or less to a peak area "z" in the range of from 650 $cm^{-1}$ or more to 1,130 $cm^{-1}$ or less.

In addition, the inventors have revealed that as the value of the A is increased, a suppressing effect on the long-term potential fluctuation becomes higher.

Although some part of the true reason for which the long-term potential fluctuation can be suppressed has not been elucidated, as a mechanism assumed from the foregoing results, it is conceivable that while potential fluctuation has been caused by the accumulation of charge in an oxidized portion in the electrophotographic photosensitive member of the related-art configuration, a structure of such composition that charge accumulation hardly occurs sufficiently grows on the surface of the support in the configuration having the IR peak area ratio. When an appropriate method for the treatment of the support is selected and the composition of the surface of the support is set to an optimum one as described above, the effect of the present invention can be achieved.

A more preferred case is a case in which the ratio A is controlled under the following condition.

$$A \geq 0.75$$

In addition, a case in which the IR peak area ratio B of the surface of the support determined by the Fourier transform infrared spectroscopy is controlled under the following condition is preferred:

$$B \leq 0.20$$

where the IR peak area ratio B represents a ratio b/z of a peak area "b" in the range of from 831 $cm^{-1}$ or more to 1,015 $cm^{-1}$ or less to the peak area "z" in the range of from 650 $cm^{-1}$ or more to 1,130 $cm^{-1}$ or less.

[Electrophotographic Photosensitive Member]

The electrophotographic photosensitive member of the present invention is characterized by including a support and a photosensitive layer.

An example of a method of manufacturing the electrophotographic photosensitive member of the present invention is a method including: preparing coating liquids for the respective layers to be described later; applying the liquids in a desired layer order; and drying the liquids. In this case, examples of a method of applying each of the coating liquids include dip coating, spray coating, inkjet coating, roll coating, die coating, blade coating, curtain coating, wire bar coating, and ring coating. Of those, dip coating is preferred from the viewpoints of efficiency and productivity.

The respective layers are described below.

<Support>

In the present invention, the electrophotographic photosensitive member includes the support. With regard to the shape of the support, a support having a cylindrical shape is used. In addition, the surface of the support may be subjected to blast treatment, cutting treatment, or the like.

With regard to a material for the support, an aluminum-made support using aluminum (Al) and/or an Al alloy is used. Although the aluminum alloy to be used is not particularly limited, examples thereof include an A3003 series aluminum alloy, an A5052 series aluminum alloy, and an A6063 series aluminum alloy. Of those, an A3003 series aluminum alloy is preferably used because the alloy has wide latitude for the IR peak area ratio A of the surface of the support. The Al alloy preferably contains, as components except Al, the following components with respect to the total mass of the Al alloy: 0.6 mass % or less of Si, 0.7 mass % or less of Fe, 0.05 mass % or more and 0.20 mass % or less of Cu, 1.0 mass % or more and 1.5 mass % or less of Mn, and 0.10 mass % or less of Zn.

In the present invention, although an approach for the setting of the IR peak area ratio A of the surface of the support to the following condition is not particularly limited, examples thereof include: hot water treatment with pure water at more than 90° C.; and treatment with a basic aqueous solution in which the pH of the solution and an immersion time therein are appropriately controlled.

$$A \geq 0.50$$

A preferred approach is, for example, a method including subjecting a cylindrical body formed of Al and/or an Al alloy to immersion treatment with pure water, and a case in which the pure water has a temperature of 91° C. or more and 98° C. or less, and the cylindrical body is immersed in the pure water for a time period of 60 seconds or more and 300 seconds or less is preferred.

<Conductive Layer>

In the present invention, a conductive layer may be arranged on the support. The arrangement of the conductive layer can conceal flaws and irregularities in the surface of the support, and control the reflection of light on the surface of the support.

The conductive layer preferably contains conductive particles and a resin.

A material for the conductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the conductive particles, and in particular, titanium oxide, tin oxide, and zinc oxide are more preferably used.

When the metal oxide is used as the conductive particles, the surface of the metal oxide may be treated with a silane coupling agent or the like, or the metal oxide may be doped with an element, such as phosphorus or aluminum, or an oxide thereof.

In addition, each of the conductive particles may be of a laminated construction having a core particle and a coating layer coating the particle. Examples of the core particle include titanium oxide, barium sulfate, and zinc oxide. The coating layer is, for example, a metal oxide, such as tin oxide.

In addition, when the metal oxide is used as the conductive particles, their volume-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the conductive layer may further contain a concealing agent, such as a silicone oil, resin particles, or titanium oxide.

The conductive layer has an average thickness of preferably 1 μm or more and 50 μm or less, particularly preferably 3 μm or more and 40 μm or less.

The conductive layer may be formed by preparing a coating liquid for a conductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the conductive particles in the coating liquid for a conductive layer, there are given methods using a paint shaker, a sand mill, a ball mill, and a liquid collision-type high-speed disperser.

<Undercoat Layer>

In the present invention, an undercoat layer may be arranged on the support or the conductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, a conductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has an average thickness of preferably 0.1 μm or more and 50 μm or less, more preferably 0.2 μm or more and 40 μm or less, particularly preferably 0.3 μm or more and 30 μm or less.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layers of electrophotographic photosensitive members are mainly classified into (1) a laminated photosensitive layer and (2) a single-layer photosensitive layer. (1) The laminated photosensitive layer has a charge-generating layer containing a charge-generating substance and a charge-transporting layer containing a charge-transporting substance. (2) The single-layer photosensitive layer has a photosensitive layer containing both a charge-generating substance and a charge-transporting substance.

(1) Laminated Photosensitive Layer

The laminated photosensitive layer includes the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer has an average thickness of preferably 0.1 μm or more and 1 μm or less, more preferably 0.15 μm or more and 0.4 μm or less.

The charge-generating layer may be formed by preparing a coating liquid for a charge-generating layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer has an average thickness of 5 μm or more and 50 μm or less, more preferably 8 μm or more and 40 μm or less, particularly preferably 10 μm or more and 30 μm or less.

The charge-transporting layer may be formed by preparing a coating liquid for a charge-transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Single-Layer Photosensitive Layer

The single-layer photosensitive layer may be formed by preparing a coating liquid for a photosensitive layer containing the charge-generating substance, the charge-transporting substance, a resin, and a solvent, forming a coat thereof, and drying the coat. Examples of the charge-generating substance, the charge-transporting substance, and the resin are the same as the examples of the materials in the section "(1) Laminated Photosensitive Layer."

<Protective Layer>

In the present invention, a protective layer may be arranged on the photosensitive layer. The arrangement of the protective layer can improve durability.

The protective layer preferably contains the conductive particles and/or the charge-transporting substance, and a resin.

Examples of the conductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acrylic group and a methacrylic group. A material having a charge-transporting ability may be used as the monomer having a polymerizable functional group.

The protective layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protective layer has an average thickness of preferably 0.5 μm or more and 10 μm or less, more preferably 1 μm or more and 7 μm or less.

The protective layer may be formed by preparing a coating liquid for a protective layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge of the present invention is characterized in that the process cartridge integrally supports the electrophotographic photosensitive member described above and at least one unit selected from the group consisting of: a charging unit; a developing unit; a transferring unit; and a cleaning unit, and is removably mounted onto the main body of an electrophotographic apparatus.

In addition, an electrophotographic apparatus of the present invention is characterized by including the electrophotographic photosensitive member described above, a charging unit, an exposing unit, a developing unit, and a transferring unit.

An example of the schematic construction of an electrophotographic apparatus including a process cartridge including an electrophotographic photosensitive member is illustrated in FIG. 1.

An electrophotographic photosensitive member 1 having a cylindrical shape is rotationally driven about a shaft 2 in a direction indicated by the arrow at a predetermined peripheral speed. The surface of the electrophotographic photosensitive member 1 is charged to a predetermined positive or negative potential by a charging unit 3. Although a roller charging system based on a roller-type charging member is illustrated in the figure, a charging system such as a corona charging system, a contact charging system, or an injection charging system may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to treatment for fixing the toner image, and is printed out to the outside of the electrophotographic apparatus. The electrophotographic apparatus may include a cleaning unit 9 for removing a deposit, such as the toner remaining on the surface of the electrophotographic photosensitive member 1 after the transfer. In addition, a so-called cleaner-less system configured to remove the deposit with the developing unit or the like without separate arrangement of the cleaning unit may be used. The electrophotographic apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12, such as a rail, may be arranged for removably mounting a process cartridge 11 of the present invention onto the main body of an electrophotographic apparatus.

The electrophotographic photosensitive member of the present invention can be used in, for example, a laser beam printer, an LED printer, a copying machine, a facsimile, and a multifunction peripheral thereof.

EXAMPLES

The present invention is described in more detail below by way of Examples and Comparative Examples. The present invention is by no means limited to the following Examples, and various modifications may be made without departing from the gist of the present invention. In the description in the following Examples, "part(s)" is by mass unless otherwise specified.

Production Example of Surface-Treated Support

Production Examples 1 to 4

An aluminum cylindrical body made of an A3003 alloy having a diameter of 30.5 mm and a length of 370 mm was used as a support. The cylindrical body was subjected to ultrasonic cleaning in a water bath containing a surfactant (product name: CHEMICOL CT, manufactured by Tokiwa Chemical Industries Co., Ltd.) at 35° C. for 80 seconds at 100 kHz, and was then subjected to ultrasonic cleaning in a pure water bath at 40° C. for 80 seconds at 100 kHz. After that, the cylindrical body was subjected to surface treatment by being immersed in the pure water tank while a water temperature and an immersion time were appropriately adjusted. Thus, a support was obtained, followed by the changing of an IR peak area ratio A in the surface of the support so that the range of $A \geq 0.75$ was satisfied. Through the foregoing steps, surface-treated supports S1 to S4 according to the present invention for producing photosensitive members were obtained. The respective conditions are shown in Table 1.

Production Examples 5 to 7

Instead of the immersion of the cylindrical body in the hot water at 95° C. for 180 seconds, the hot water temperature and the immersion time were appropriately adjusted to change the IR peak area ratios A and B of the surface of the support so that the ranges of $A \geq 0.50$ and $B \leq 0.20$ were satisfied. Supports S5 to S7 were each obtained under the same conditions as those of Production Example 1 except the foregoing. The respective conditions are shown in Table 1.

Production Examples 8 to 11

Instead of the immersion of the cylindrical body in the hot water at 95° C. for 180 seconds, the hot water temperature and the immersion time were appropriately adjusted to change the IR peak area ratios A and B of the surface of the support so that the ranges of $A \geq 0.50$ and $B > 0.20$ were satisfied. Supports S8 to S11 were each obtained under the same conditions as those of Production Example 1 except the foregoing. The respective conditions are shown in Table 1.

Comparative Production Examples 1 to 5

Supports R1 to R5 were each obtained in the same manner as in Production Example 1 except that the water temperature and the immersion time were appropriately adjusted to change the IR peak area ratio A so that the range of $A < 0.50$ was satisfied. The respective conditions are shown in Table 1.

Comparative Production Example 6

A support R6 was obtained in the same manner as in Production Example 1 except that after the ultrasonic cleaning, the cylindrical body was immersed in pure water at normal temperature instead of being immersed in the hot water to be subjected to the surface treatment. Production conditions are shown in Table 1.

Comparative Production Example 7

A support R7 was obtained in the same manner as in Production Example 1 except that after the ultrasonic cleaning, the surface of the support was subjected to anodization treatment instead of the surface treatment thereof by the hot water immersion. The anodization was performed by using an electrolyte solution having a sulfuric acid concentration of 180 g/l and a dissolved aluminum concentration of 7 g/l at a current density of 1.2 A/dm$^2$. Further, sealing treatment was performed by washing the anodized support with water and then immersing the support in an aqueous solution of nickel acetate at 95° C. for 30 minutes. Production conditions are shown in Table 1.

Comparative Production Example 8

A support R8 was obtained in the same manner as in Production Example 1 except that after the ultrasonic cleaning, the cylindrical body was immersed in hot water at 95° C. for 20 seconds, and was further subjected to oxidation treatment in an oven heated to 120° C. for 20 minutes. Production conditions are shown in Table 1.

TABLE 1

| | Treatment method | Treatment temperature [° C.] | Treatment time [s] |
|---|---|---|---|
| S1 | Hot water | 95 | 180 |
| S2 | Hot water | 95 | 120 |
| S3 | Hot water | 95 | 240 |
| S4 | Hot water | 95 | 300 |
| S5 | Hot water | 93 | 180 |
| S6 | Hot water | 91 | 180 |
| S7 | Hot water | 91 | 120 |
| S8 | Hot water | 96 | 180 |
| S9 | Hot water | 98 | 180 |
| S10 | Hot water | 98 | 120 |
| S11 | Hot water | 98 | 60 |
| R1 | Hot water | 90 | 600 |
| R2 | Hot water | 90 | 180 |
| R3 | Hot water | 75 | 180 |
| R4 | Hot water | 80 | 60 |
| R5 | Hot water | 75 | 60 |
| R6 | Water | 25 | 180 |
| R7 | Anodization | (95) | (1,800) |
| R8 | Hot water + atmospheric oxidation | 95 (+120) | 20 (+1,200) |

Production Example of Electrophotographic Photosensitive Member

Example 1

The support S1 was used as a support.

100 Parts of zinc oxide particles (specific surface area: 19 $m^2/g$, powder resistivity: $4.7'10^6$ Ω·cm) were stirred and mixed with 500 parts of toluene, and 0.8 part of a silane coupling agent was added to the mixture, followed by stirring for 6 hours. After that, toluene was evaporated under reduced pressure, and the residue was dried under heating at 130° C. for 6 hours to provide surface-treated zinc oxide particles. KBM-602 manufactured by Shin-Etsu Chemical Co., Ltd. (compound name: N-2-(aminoethyl)-3-aminopropylmethyldimethoxysilane) was used as the silane coupling agent.

Next, 15 parts of a polyvinyl butyral resin (weight-average molecular weight: 40,000, product name: BM-1, manufactured by Sekisui Chemical Company, Limited) serving as a polyol resin and 15 parts of a blocked isocyanate (product name: Sumidur 3175, manufactured by Sumika Covestro Urethane Co., Ltd. (former Sumika Bayer Urethane Co., Ltd.)) were dissolved in a mixed solution of 73.5 parts of methyl ethyl ketone and 73.5 parts of 1-butanol. 80.8 Parts of the surface-treated zinc oxide particles and 0.8 part of 2,3,4-trihydroxybenzophenone (manufactured by Tokyo Chemical Industry Co., Ltd.) were added to the solution, and the mixture was subjected to dispersion with a sand mill apparatus using glass beads each having a diameter of 0.8 mm under an atmosphere at 23° C.±3° C. for 3 hours. After the dispersion, 0.01 part of a silicone oil (product name: SH28PA, manufactured by Dow Corning Toray Co., Ltd.) and 5.6 parts of crosslinked polymethyl methacrylate (PMMA) particles (product name: TECHPOLYMER SSX-103, manufactured by Sekisui Kasei Co., Ltd., average primary particle diameter: 3 μm) were added to the dispersed product, and the mixture was stirred to prepare a coating liquid for an undercoat layer.

The coating liquid for an undercoat layer was applied onto the support by dip coating to form a coat, and the resultant coat was dried for 40 minutes at 160° C. to form an undercoat layer having a thickness of 18 μm.

Next, 4 parts of a hydroxygallium phthalocyanine crystal (charge-generating substance) of a crystal form having strong peaks at Bragg angles 2θ±0.2° of 7.4° and 28.1° in CuKα characteristic X-ray diffraction, and 0.04 part of a compound represented by the following formula (1) were added to a liquid obtained by dissolving 2 parts of polyvinyl butyral (product name: S-LEC BX-1, manufactured by Sekisui Chemical Company, Limited) in 100 parts of cyclohexanone.

(1)

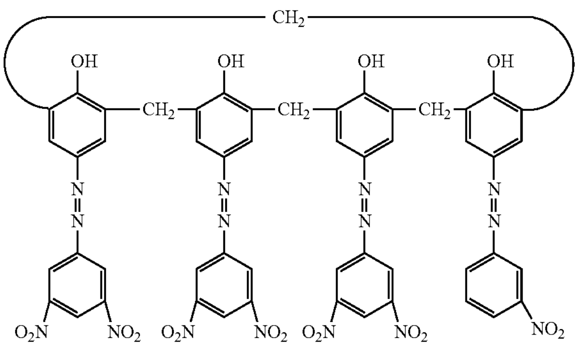

After that, the mixture was subjected to dispersion treatment with a sand mill using glass beads each having a diameter of 1.0 mm under an atmosphere at a temperature of 23° C.±3° C. for 1 hour. After the dispersion treatment, 100 parts of ethyl acetate was added to the dispersed product to prepare a coating liquid for a charge-generating layer. The coating liquid for a charge-generating layer was applied onto the undercoat layer by dip coating, and the resultant coat was dried for 10 minutes at a temperature of 90° C. to form a charge-generating layer having a thickness of 0.21 μm.

Next, 30 parts of a compound (charge-transporting substance) represented by the following formula (2), 60 parts of a compound (charge-transporting substance) represented by the following formula (3), 10 parts of a compound represented by the following formula (4), 100 parts of polycarbonate (product name: IUPILON Z400, manufactured by Mitsubishi Engineering-Plastics Corporation, bisphenol Z type), and 0.02 part of polycarbonate having two structural units represented by the following formula (5) (viscosity-average molecular weight Mv: 20,000) were mixed with 272 parts of o-xylene, 256 parts of methyl benzoate, and 272 parts of dimethoxymethane (methylal) to prepare a coating liquid for a charge-transporting layer. The coating liquid for a charge-transporting layer was applied onto the charge-generating layer by dip coating to form a coat, and the resultant coat was dried for 50 minutes at 115° C. to form a charge-transporting layer having a thickness of 18 μm.

(2)

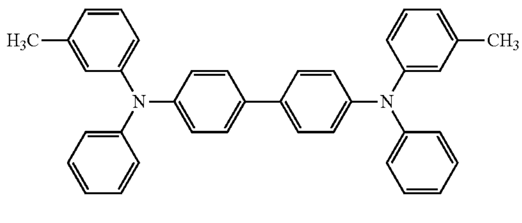

-continued (3)

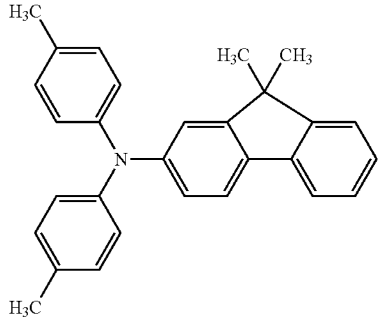

(4)

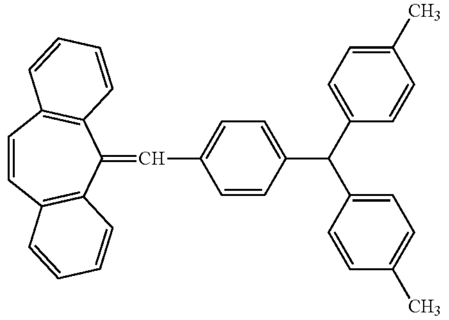

(5)

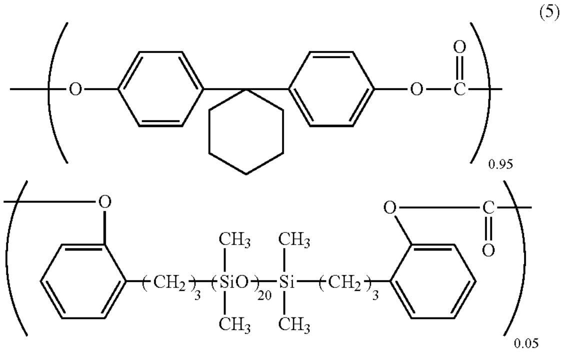

Next, 95 parts of a compound represented by the following formula (6), 5 parts of a vinyl ester compound (manufactured by Tokyo Chemical Industry Co., Ltd.) that was a compound represented by the following formula (7), 3.5 parts of a siloxane-modified acrylic compound (BYK-3550, manufactured by BYK-Chemie Japan K.K.), and 5 parts of a urea compound represented by the following formula (8) were mixed with 200 parts of 1-propanol and 100 parts of 1,1,2,2,3,3,4-heptafluorocyclopentane (product name: ZEORORA H, manufactured by Zeon Corporation), and the mixture was stirred.

After that, the solution was filtered with a polyflon filter (product name: PF-020, manufactured by Advantec Toyo Kaisha, Ltd.) to prepare a coating liquid for a surface layer (coating liquid for a protective layer).

The coating liquid for a surface layer was applied onto the charge-transporting layer by dip coating to form a coat, and the resultant coat was dried for 10 minutes at 50° C. After that, under a nitrogen atmosphere, the coat was irradiated with electron beams for 1.6 seconds under the conditions of an acceleration voltage of 70 kV and a beam current of 5.0 mA while the support (irradiation target body) was rotated at a speed of 200 rpm. The absorbed dose of the electron beams at this time was measured to be 15 kGy. After that, the coat was heated by increasing the temperature of the coat from 25° C. to 117° C. under the nitrogen atmosphere over 30 seconds. An oxygen concentration during a time period from the electron beam irradiation to the heating treatment after the irradiation was 15 ppm or less. Next, the coat was naturally cooled in the atmosphere until the temperature of the coat became 25° C., and the coat was subjected to heating treatment for 30 minutes under such a condition that the temperature of the coat became 105° C. Thus, a protective layer (surface layer) having a thickness of 5 μm was formed.

(6)

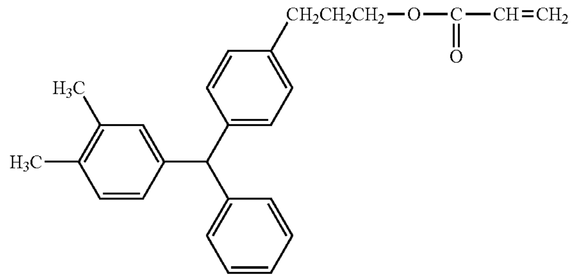

(7)

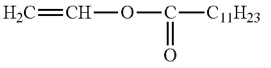

(8)

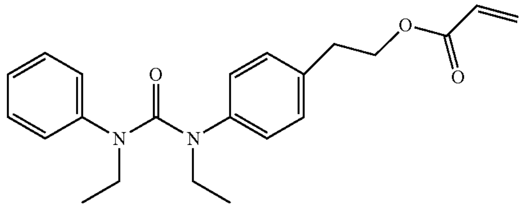

The surface of the produced electrophotographic photosensitive member may be subjected to surface processing treatment for reducing a frictional force with a member that may be brought into abutment with the surface of the photosensitive member. Examples of the surface processing treatment include polishing processing treatment and shape processing treatment.

[Evaluation]

<Preparation of Support Piece for Evaluation>

A support piece for an evaluation is prepared by cutting a 1-centimeter square piece out of a position distant from the upper end of the surface-treated support having a cylindrical shape or of the support of the electrophotographic photosensitive member after the application of its photosensitive layer by 180 mm. In this evaluation, 8 sample pieces were prepared in the circumferential direction of the support, and the average of the measurement results of the respective sample pieces was adopted. When the support pieces are each collected from the photosensitive member, the photosensitive layer is removed so that the surface of the support may be exposed. Examples of a method for the removal include dissolution with an organic solvent and removal with a buffing machine. When the removal is performed by polishing, an appropriate polishing time and an appropriate polishing agent are determined from the polishing rate of the photosensitive layer so that the outermost surface of the support may not be excessively shaved.

<Evaluation of Surface Composition>

An FT-IR spectrum was used as a method of evaluating the composition of the surface of the support. The FT-IR spectrum was measured with a Fourier transform infrared spectrophotometer (Spectrum One; manufactured by PerkinElmer, Inc.) mounted with a universal ATR sampling accessory by an ATR method. A specific measurement procedure, and methods of calculating peak areas "a", "b", and "z", and IR peak area ratios A and B are as described below.

The angle of incidence of infrared light is set to 45°. The ATR crystal of Ge (refractive index=4.0) is used as an ATR crystal. The other conditions are as described below.

Range

Start: 4,000 $cm^{-1}$

End: 600 $cm^{-1}$ (the ATR crystal of Ge)

Duration

Scan number: 16

Resolution: 4.00 $cm^{-1}$

Advanced: $CO_2/H_2O$ correction is present.

[Method of Calculating Peak Intensity Ratio]

(1) The ATR crystal of Ge (refractive index=4.0) is mounted on the apparatus.

(2) The scan type of the apparatus is set to "Background" and the units thereof are set to "EGY", followed by the measurement of a background.

(3) The scan type is set to "Sample" and the units thereof are set to "A".

(4) The support pieces are each arranged on the ATR crystal so that its surface may be on an ATR crystal side.

(5) The sample is pressurized with the pressure arm of the apparatus (its force gauge is set to 80).

(6) The FT-IR spectrum of the sample is measured.

(7) The resultant FT-IR spectrum is subjected to baseline correction by the automatic correction of the apparatus.

(8) The spectrum after the baseline correction is subjected to ATR correction.

(9) The integrated value "a" of an absorption peak intensity in the range of from 1,016 $cm^{-1}$ or more to 1,130 $cm^{-1}$ or less is calculated.

(10) The integrated value "b" of an absorption peak intensity in the range of from 831 $cm^{-1}$ or more to 1,015 $cm^{-1}$ or less is calculated.

(11) The integrated value "z" of an absorption peak intensity in the range of from 650 $cm^{-1}$ or more to 1,130 $cm^{-1}$ or less is calculated.

(12) A ratio a/z is defined as an IR peak area ratio A.

(13) A ratio b/z is defined as an IR peak area ratio B.

(14) The magnitude of the calculated value of each of the A and the B is evaluated.

Figure 2:
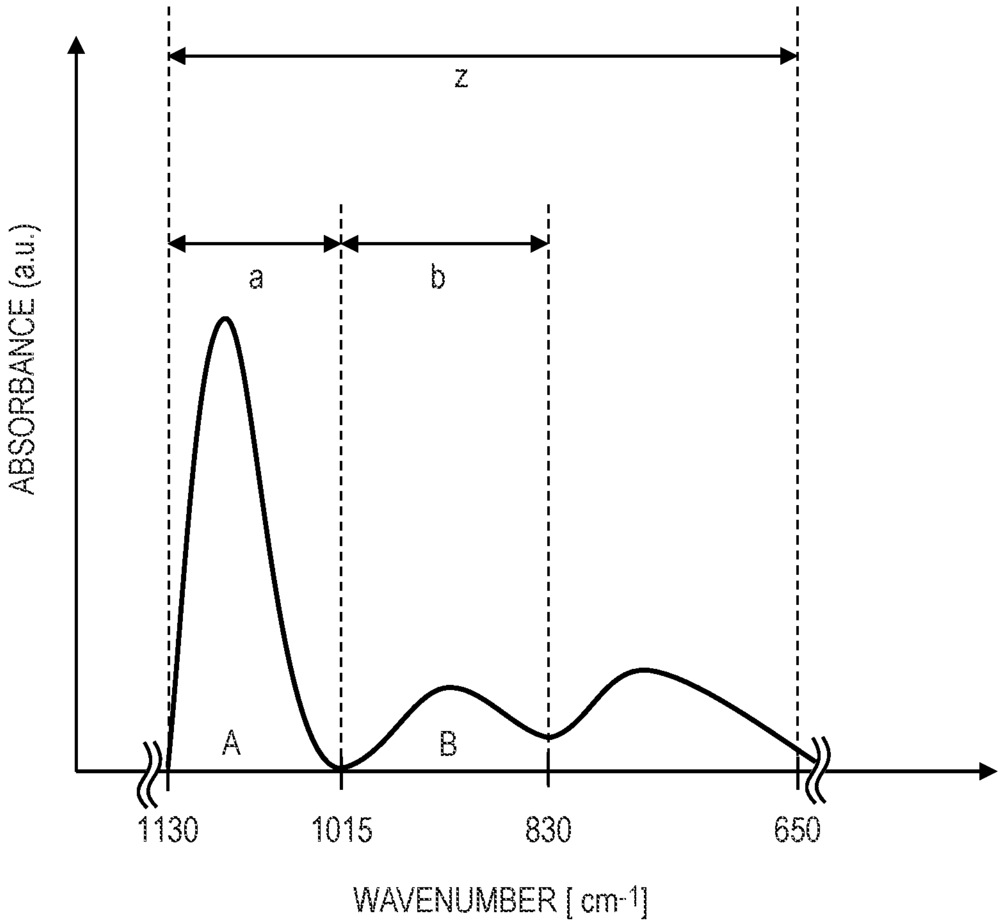
FIG. 2 is a graph for schematically showing IR peak area ratios A and B defined in the present invention.

A schematic graph of the IR spectrum is shown in FIG. 2. Herein, it has been found that as the value of the A becomes larger, the long-term potential fluctuation of the electrophotographic photosensitive member can be suppressed to a larger extent. This is probably because the ratio of composition that hardly causes charge accumulation on the surface of the support becomes larger to establish a state advantageous for the suppression of the long-term potential fluctuation. It has also been found that even in the ranges of $A \geq 0.5$ and $B \leq 0.2$, the long-term potential fluctuation is easily suppressed. This is probably because the ratio of composition that easily causes charge accumulation on the surface of the support becomes smaller.

The evaluation results are shown in Table 2.

<Evaluation of Depth Direction Composition>

ESCA that was X-ray photoelectron spectroscopy was used as a method of evaluating the depth direction composition of the support. Analysis conditions are as described below.

Used apparatus: VersaProbe II manufactured by ULVAC-PHI, Inc.

X-ray source: Al Kα 1,486.6 eV (25 W, 15 kV)

Measurement area: φ100 μm

Spectral region: 300 μm×200 μm, angle: 45°

Pass energy: 58.70 eV

Step size: 0.125 eV

Sputtering gas: Ar

Sputtering conditions: 1 kV, 4×4

A surface atom concentration (atom %) is calculated from the peak intensity of each element measured under the foregoing conditions with a relative sensitivity factor provided by ULVAC-PHI, Inc. The measurement peak top range of each element adopted is as described below.

O: The energy of a photoelectron derived from an electron orbit 1s: 525 eV to 545 eV Al: The energy of a photoelectron derived from an electron orbit 2p: 68 eV to 80 eV The element ratio O/Al of the outermost surface of the support was represented by X, and a region from the outermost surface of the support in its depth direction, the region in the support satisfying a value of X±0.1X, was evaluated as a depth D. The D is preferably 40 nm or more and 1 μm or less. This is because of the following reasons: when the D is less than 40 nm, the image defect-concealing property of the electrophotographic photosensitive member may reduce, or a suppressing effect on the long-term potential fluctuation thereof may become smaller; and when the D is more than 1 μm, the suppressing effect on the long-term potential fluctuation may become smaller. The evaluation result is shown in Table 2.

<Evaluation of Electrical Characteristic>

A reconstructed machine of an electrophotographic apparatus (copying machine) manufactured by Canon Inc. (product name: imagePRESS C910) was used as an evaluation apparatus.

The surface potential of the electrophotographic photosensitive member was measured as follows: a cartridge for development was removed from the evaluation apparatus; a potential probe (product name: model 6000B-8, manufactured by Trek, Inc.) was fixed in the position of the cartridge; and the measurement was performed with a surface potentiometer (model 344: manufactured by Trek, Inc.).

First, the dark potential (Vd) of the electrophotographic photosensitive member to be used in the evaluation was adjusted to −600 V. Next, the light potential (Vl) of the surface of the electrophotographic photosensitive member was measured under a constant condition of the exposure light quantity of an exposing apparatus. An average in one round of the photosensitive member at a position distant from the upper end of the photosensitive member by 180 mm was adopted as the value of the light potential and evaluated. Next, 100,000 sheets of paper were passed with the imagePRESS C910 under an environment at 27° C. and 60% RH, and then the surface potential was similarly measured. Evaluation criteria were set as described below.

◎: The photosensitive member is extremely superior to a related-art photosensitive member (its potential fluctuation is less than 5 V).

○: The photosensitive member is superior to the related-art photosensitive member (its potential fluctuation is 5 V or more and less than 10 V).

●: The photosensitive member is somewhat superior to the related-art photosensitive member (its potential fluctuation is 10 V or more and less than 15 V).

Δ: The photosensitive member is comparable to the related-art photosensitive member (its potential fluctuation is 15 V or more and less than 30 V).

The evaluation results are shown in Table 2.

<Image Evaluation>

Subsequently, a halftone image was output on A3 paper under a constant condition of the exposure light quantity, and the presence or absence of an image defect was recognized. Evaluation criteria were set as described below.

◯: No image defect is present.

Δ: An image defect causing no problem in practical use is present.

The evaluation result is shown in Table 2.

Examples 2 to 11

Electrophotographic photosensitive members were each produced in the same manner as in Example 1 except that the supports S2 to S11 were each used as a support instead of the support S1, followed by their evaluations. The evaluation results are shown in Table 2.

Comparative Examples 1 to 8

Electrophotographic photosensitive members were each produced in the same manner as in Example 1 except that the supports R1 to R8 were each used as a support instead of the support S1, followed by their evaluations. The evaluation results are shown in Table 2.

TABLE 2

| | Potential fluctuation amount [-V] | Initial potential [-V] | Potential after endurance [-V] | Image defect | A | B | D [nm] |
|---|---|---|---|---|---|---|---|
| Example 1 | ◎ (3.3) | 195.4 | 198.7 | ○ | 0.81 | 0.10 | 62 |
| Example 2 | ◎ (4.1) | 196.1 | 200.2 | ○ | 0.76 | 0.10 | 48 |
| Example 3 | ◎ (4.4) | 196.5 | 200.9 | ○ | 0.77 | 0.19 | 81 |
| Example 4 | ○ (5.7) | 197.0 | 202.7 | ○ | 0.75 | 0.22 | 104 |
| Example 5 | ○ (8.1) | 194.5 | 202.6 | ○ | 0.66 | 0.11 | 51 |
| Example 6 | ○ (8.8) | 193.6 | 202.4 | ○ | 0.59 | 0.15 | 49 |
| Example 7 | ○ (9.2) | 192.9 | 202.1 | ○ | 0.50 | 0.19 | 42 |
| Example 8 | ◯ (10.4) | 196.6 | 207.0 | ○ | 0.64 | 0.25 | 64 |
| Example 9 | ◯ (11.1) | 198.1 | 209.2 | ○ | 0.56 | 0.29 | 68 |
| Example 10 | ◯ (11.6) | 197.3 | 208.9 | ○ | 0.52 | 0.30 | 56 |
| Example 11 | ◯ (13.2) | 196.5 | 209.7 | ○ | 0.51 | 0.32 | 36 |
| Comparative Example 1 | Δ (16.5) | 199.4 | 215.9 | ○ | 0.41 | 0.45 | 180 |
| Comparative Example 2 | Δ (18.5) | 193.0 | 211.5 | ○ | 0.35 | 0.45 | 45 |
| Comparative Example 3 | Δ (19.1) | 191.9 | 211.0 | ○ | 0.32 | 0.46 | 41 |
| Comparative Example 4 | Δ (21.4) | 192.2 | 213.6 | ○ | 0.21 | 0.42 | 30 |
| Comparative Example 5 | Δ (23.6) | 191.5 | 215.1 | ○ | 0.16 | 0.39 | 27 |
| Comparative Example 6 | Δ (25.5) | 191.3 | 216.8 | Δ | 0.09 | 0.32 | 18 |
| Comparative Example 7 | Δ (27.7) | 197.9 | 225.6 | ○ | 0.11 | 0.85 | 2,080 |
| Comparative Example 8 | Δ (29.8) | 201.1 | 230.9 | ○ | 0.05 | 0.93 | 11,050 |

It is found from the evaluation results that as the IR peak area ratio A becomes larger, the long-term potential fluctuation can be suppressed to a larger extent. In addition, it is found that when the IR peak area ratios A of two electrophotographic photosensitive members show the same level of value, as the IR peak area ratio B becomes smaller, the long-term potential fluctuation can be suppressed to a larger extent. In addition, it is found that in each of Examples, the surface treatment of the support is sufficiently performed, and hence an image defect can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-031207, filed Feb. 26, 2021, which is hereby incorporated by reference herein in its entirety.

What is claimed is:

1. An electrophotographic photosensitive member, comprising:

a support having a cylindrical shape, the support having a surface formed of Al and/or an Al alloy;

an undercoat layer formed on the support, the undercoat layer being a cured film formed by polymerizing a composition containing a polyvinyl butyral resin and a monomer having a blocked isocyanate group, and the cured film containing surface-treated zinc oxide particles;

a charge-generating layer on the undercoat layer, the charge-generating layer containing a hydroxygallium phthalocyanine crystal;

a charge-transporting layer on the charge-generating layer, the charge-transporting layer containing a charge-transporting substance and a polycarbonate resin; and a protective layer on the charge-transporting layer, the protective layer being a cured film formed by polymerizing a composition containing a monomer having a polymerizable acrylic functional group or a polymerizable methacrylic functional group, wherein $A \geq 0.75$ in an IR peak area ratio of the surface of the support determined by Fourier transform infrared spectroscopy when A represents a ratio a/z of a peak area "a" in a range of 1,016-1,130 $cm^{-1}$ to a peak area "z" in a range of 650-1,130 $cm^{-1}$.

2. The electrophotographic photosensitive member according to claim 1, wherein $B \leq 0.20$ in an IR peak area ratio of the surface of the support determined by Fourier transform infrared spectroscopy when B represents a ratio b/z of a peak area "b" in a range of 831-1,015 $cm^{-1}$ to the peak area "z".

3. The electrophotographic photosensitive member according to claim 1, wherein 40 nm≤D≤1 μm when X is an element ratio O/Al of an outermost surface of the support determined by X-ray photoelectron spectroscopy, and D is a depth of a region satisfying a value of $X \pm 0.1X$.

4. The electrophotographic photosensitive member according to claim 1, wherein the support is formed of an Al alloy that contains, with respect to a total mass of the Al alloy, 0.6 mass % or less Si, 0.7 mass % or less Fe, 0.05 to 0.20 mass % Cu, 1.0 to 1.5 mass % Mn, and 0.10 mass % or less Zn.

5. A process cartridge, comprising:

an electrophotographic photosensitive member; and at least one unit selected from the group consisting of a charging unit, a developing unit and a cleaning unit;

the process cartridge integrally supporting the electrophotographic photosensitive member and the at least one unit, and being removably mounted onto a main body of an electrophotographic apparatus; and the electrophotographic photosensitive member including a support having a cylindrical shape having a surface formed of Al and/or an Al alloy, with an undercoat a layer formed on the support, the undercoat layer being a cured film formed by polymerizing a composition containing a polyvinyl butyral resin and a monomer having a blocked isocyanate group, and the cured film containing surface-treated zinc oxide particles;

a charge-generating layer on the undercoat layer, the charge-generating layer containing a hydroxygallium phthalocyanine crystal;

a charge-transporting layer on the charge-generating layer, the charge-transporting layer containing a charge-transporting substance and a polycarbonate resin; and a protective layer on the charge-transporting layer, the protective layer being a cured film formed by polymerizing a composition containing a monomer having a polymerizable acrylic functional group or a polymerizable methacrylic functional group, wherein A≥0.75 in an IR peak area ratio of the surface of the support determined by Fourier transform infrared spectroscopy when A represents a ratio a/z of a peak area "a" in a range of 1,016-1,130 $cm^{-1}$ to a peak area "z" in a range of 650-1,130 $cm^{-1}$.

6. An electrophotographic apparatus, comprising:

an electrophotographic photosensitive member;

a charging unit;

an exposing unit;

a developing unit; and a transferring unit;

the electrophotographic photosensitive member including a support having a cylindrical shape having a surface formed of Al and/or an Al alloy, with an undercoat layer formed on the support, the undercoat layer being a cured film formed by polymerizing a composition containing a polyvinyl butyral resin and a monomer having a blocked isocyanate group, and the cured film containing surface-treated zinc oxide particles;

a charge-generating layer on the undercoat layer, the charge-generating layer containing a hydroxygallium phthalocyanine crystal;

a charge-transporting layer on the charge-generating layer, the charge-transporting layer containing a charge-transporting substance and a polycarbonate resin; and a protective layer on the charge-transporting layer, the protective layer being a cured film formed by polymerizing a composition containing a monomer having a polymerizable acrylic functional group or a polymerizable methacrylic functional group, wherein A≥0.75 in an IR peak area ratio of the surface of the support determined by Fourier transform infrared spectroscopy when A represents a ratio a/z of a peak area "a" in a range of 1,016-1,130 $cm^{-1}$ to a peak area "z" in a range of 650-1,130 $cm^{-1}$.

7. A method of manufacturing an electrophotographic photosensitive member including a support having a cylindrical shape an undercoat layer formed on the support, the undercoat layer being a cured film formed by polymerizing a composition containing a polyvinyl butyral resin and a monomer having a blocked isocyanate group, and the cured film containing surface-treated zinc oxide particles;

a charge-generating layer on the undercoat layer, the charge-generating layer containing a hydroxygallium phthalocyanine crystal;

a charge-transporting layer on the charge-generating layer, the charge-transporting layer containing a charge-transporting substance and a polycarbonate resin; and a protective layer on the charge-transporting layer, the protective layer being a cured film formed by polymerizing a composition containing a monomer having a polymerizable acrylic functional group or a polymerizable methacrylic functional group, comprising the steps of:

forming the support by immersing a cylindrical body formed of Al and/or an Al alloy in pure water, the pure water having a temperature of 91 to 98° C., and the cylindrical body being immersed in the pure water for a time period of 60 to 300 seconds, wherein A≥0.75 in an IR peak area ratio of the surface of the support determined by Fourier transform infrared spectroscopy when A represents a ratio a/z of a peak area "a" in a range of 1,016-1,130 $cm^{-1}$ to a peak area "z" in a range of 650-1,130 $cm^{-1}$.

8. The electrophotographic photosensitive member according to claim 3, wherein 40 nm≤D≤81 nm.

9. The electrophotographic photosensitive member according to claim 2, wherein B≤0.10.

10. The method of manufacturing an electrophotographic photosensitive member according to claim 7, wherein the pure water has a temperature of 95° C., and the time period is 60 to 240 seconds.

11. The method of manufacturing an electrophotographic photosensitive member according to claim 7, wherein 40 nm≤D≤1 μm when X is an element ratio O/Al of an outermost surface of the support determined by X-ray photoelectron spectroscopy, and D is a depth of a region satisfying a value of X±0.1X.

12. The method of manufacturing an electrophotographic photosensitive member according to claim 11, wherein 40 nm≤D≤81 nm.

13. The method of manufacturing an electrophotographic photosensitive member according to claim 11, wherein B≤0.20 in an IR peak area ratio of the surface of the support determined by Fourier transform infrared spectroscopy when B represents a ratio b/z of a peak area "b" in a range of 831-1,015 $cm^{-1}$ to the peak area "z".

14. The method of manufacturing an electrophotographic photosensitive member according to claim 13, wherein B≤0.10.

* * * * *